Figure 3:
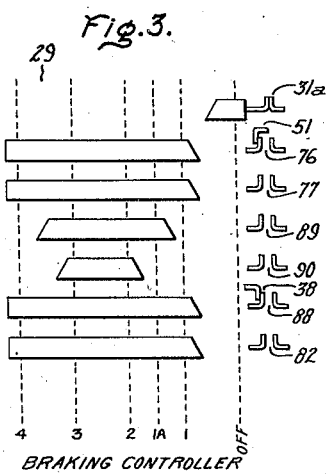

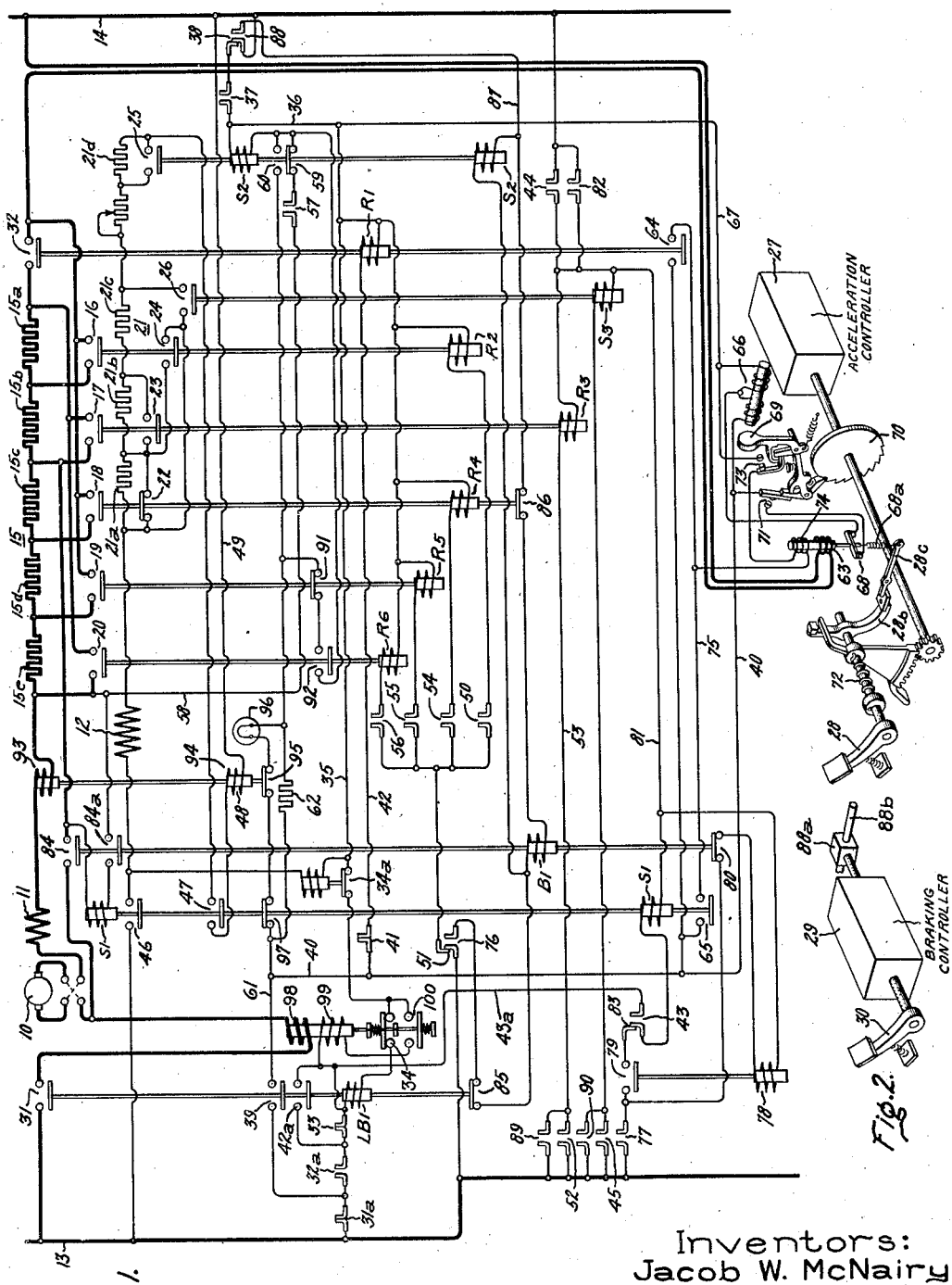

April 23, 1940.    C. MacDONALD ET AL    2,198,481
MOTOR CONTROL SYSTEM
Filed Nov. 25, 1938    2 Sheets-Sheet 2

BRAKING CONTROLLER

ACCELERATION CONTROLLER

Inventors:
Jacob W. McNairy,
Charles MacDonald,
by Harry E. Dunham
Their Attorney.

Patented Apr. 23, 1940

2,198,481

UNITED STATES PATENT OFFICE 2,198,481

MOTOR CONTROL SYSTEM

Charles MacDonald and Jacob W. McNairy, Erie, Pa., assignors to General Electric Company, a corporation of New York Application November 25, 1938, Serial No. 242,226

13 Claims. (Cl. 172—179)

This invention relates to motor control systems, more particularly to systems of control for electric motor driven trolley buses or coaches utilizing compound motors, and has for its object a simple and reliable control system giving smooth operation of the vehicle during motoring operation and regenerative or dynamic braking operation.

Compound motors have certain desirable characteristics for use in vehicles, such as trolley buses, and also undesirable characteristics under certain conditions of operation due to the fact that the shunt field winding is not controlled with the armature circuit. Particularly the shunt field has been found to give regenerative braking and hence jerky operation when power is reapplied after coasting while the vehicle is running at a speed high enough to produce regenerative braking. Thus, when power is reapplied, the strong shunt field produces regenerative braking, if the speed is high enough, until the controller has been moved far enough to reduce the shunt field excitation to a point where the motor again resumes motoring operation.

When the controller is operated manually, this irregular operation can, of course, be prevented to a certain extent by the judgment of the operator in moving the controller very quickly to a position corresponding to the existing speed of the vehicle. Such operation, however, is difficult of attainment and cannot be depended upon. When the controller is operated step-by-step in a predetermined time sequence, such as with the mechanism of the Tritle and McNairy Patent No. 2,114,196, issued April 12, 1938, an appreciable time, possibly one or more seconds, is required for the controller to be moved to the required motoring position. During part of that time, the vehicle may be braked regeneratively. One object of this invention is to provide a smooth control preventing regenerative braking when power is reapplied after coasting.

In accordance with the invention, means are provided responsive to the operation of the motor for controlling a resistance in circuit with the shunt field winding so as to leave the resistance in the shunt field circuit for reduced shunt field excitation when power is reapplied after coasting but short circuiting this resistance for normal shunt field when the motor is started from rest or accelerated from speeds below the regenerative braking speed. In one form of the invention, the current in the motor armature circuit, as measured by the voltage across the motor armature accelerating resistance, is used to control this field resistance. Thus, when power is reapplied while the vehicle is operating at a speed high enough to give regenerative braking, the current in the accelerating resistance is relatively low with correspondingly low voltage drop across the accelerating resistance and, therefore, the field resistance remains in the shunt field circuit. During normal acceleration, the voltage drop across the accelerating resistance is great enough to cause early shunting of the field resistance for normal shunt field excitation.

Another feature of this invention is the control of the shunt field excitation during dynamic braking in response to the voltage drop across the dynamic braking resistance in such manner that when the vehicle has been braked to a low speed, such as three or four miles per hour, the shunt field is deenergized in response to the low voltage drop across the braking resistance.

We have also provided air brake air supply control means operated by the braking controller in such manner as to coordinate the air brakes with the dynamic braking.

Figure 4:
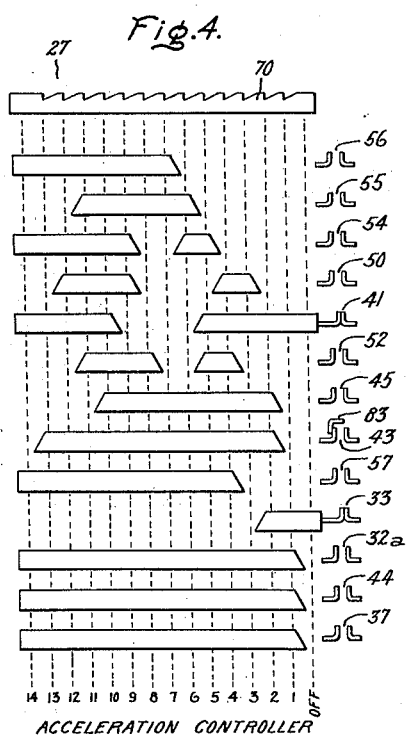
Figure 5:
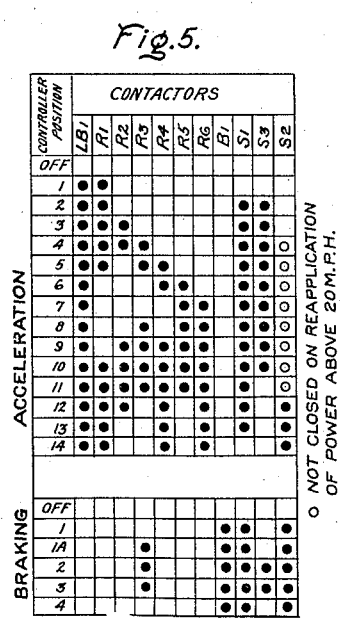

For a more complete understanding of our invention, reference should be had to the accompanying drawings, Fig. 1 of which is diagrammatic representation of a system of control for a trolley bus embodying our invention; Fig. 2 is a perspective view of the braking controller; Fig. 3 is a lay-out diagram of the braking controller shown in Fig. 2; Fig. 4 is a lay-out diagram of the acceleration controller of Fig. 1, while Fig. 5 is a sequence chart of the principal contactors and relays shown in Fig. 1 for the various positions of the acceleration controller and the braking controller.

Referring to the drawings, we have shown our invention in one form as applied to a system of control for a trolley bus or coach driven by a compound direct current motor provided with an armature 10, a series field winding 11 and a shunt field winding 12. The motor is connected to the direct current supply mains 13 and 14, energized by suitable trolleys bearing on overhead trolley wires, through an accelerating resistor 15 which may be cut out in sections by control switches 16 to 20, inclusive, and 32. The shunt field 12 is energized from the supply mains through a resistor 21, sections of which are controlled by switches 22 to 26 inclusive.

This control is effected by means of a rotatable drum type acceleration controller 27 which is moved forward automatically step-by-step, when the pedal 28 is depressed, by mechanism such as disclosed in the aforesaid Tritle and McNairy Patent No. 2,114,196. Also a separate controller 29 is provided for controlling the dynamic braking connections, this controller being rigidly connected to and operated separately by a braking pedal 30. The sequence of energization of the switch operating coils LB1, R1 to R6, inclusive, B1, S1, S2, and S3 by the controllers 27 and 29, which are electrically interlocked so that one must be in the off position when the other is operating, is indicated in the sequence chart, Fig. 3.

When it is desired to start the motor 10, the braking controller pedal 30 is released so that the braking controller is moved by a spring back to its off position. The acceleration controller pedal 28 is then depressed. It may, for example, be depressed by the operator to its full speed position immediately for the most rapid acceleration, and thereafter the acceleration controller 27 is turned step-by-step automatically to its high speed running position.

In the first position of the acceleration controller, the coils LB1 and R1 are energized and the motor starts with its series field only energized, the LB1 switch 31 and R1 switch 32 in the motor circuit being closed. The circuit of the LB1 coil is from the supply main 13 through the switch 31a on the braking controller 29 which is closed, switch 32a in the controller 27 which is closed, switch 33 in the controller 27, the LB1 operating coil, overload relay switch 34, over-voltage relay switch 34a, conductor 35, conductor 36, switch 37 on the controller 27 which is closed, switch 38 on the controller 29 which is closed to main 14. The circuit of the coil R1 is from main 13 through switch 31a, LB1 switch 39 which is closed, conductor 40, switch 41 in controller 27 which is closed, conductor 42 and coil R1 to conductor 36.

The over-voltage relay 34a is responsive to the voltage across the motor 10 and is adjusted to pick up and deenergize the motor upon the occurrence of a predetermined maximum voltage which is higher than the voltage normally applied to the mains 13 and 14. This relay is especially useful in deenergizing the motor when it is operating as a regenerative braking generator in the event that the feeding of regenerative braking current back to the mains is interrupted and excessive voltage across the motor results. For example, a trolley may become disengaged from its wire or the circuit feeding the supply mains might be temporarily open circuited.

In the next or second position of the controller 27, the lower S1 coil and the S3 coil are energized. Lower coil S1 circuit; from main 13 through the switches 31a, switch 32a, LB1 interlock switch 42a which is closed, conductor 43a, switch 43 in controller 27 which is closed, lower coil S1, switch 44 in the controller 27 which is closed to main 14. Circuit of coil S3; from main 13, through switch 45 in controller 27, the coil S3 and switch 44 to main 14.

This closes the circuit of the shunt field winding 12 from main 13 through S1, switch 46, the shunt winding 12, S3 switch 26 which is closed, resistance 21d, S1 switch 47, the maximum speed relay coil 48 and conductor 49 to main 14. The resistance 21d is of high value, equal to or greater than resistance 21a, and limits the current in the shunt field winding to a low value. The resistances 21b and 21c are of relatively low value.

In the next five steps of the controller 27, 3 to 7 inclusive, the R2, R3, R4, R5 and R6 coils are energized to progressively short circuit sections of the resistor 15 and thereby accelerate the motor. Also the high resistance 21d is shorted for normal shunt field excitation and other sections of the resistance 21 are inserted to decrease the shunt excitation and thereby increase the motor speed. These steps will now be described in detail.

In the third position of controller 27 its switch 50 closes, closing the circuit of coil R2 from main 13 through the switch 51 in controller 29 which is closed, switch 50, coil R2 to the conductor 36 and through switches 37 and 38 to the main 14. The coil R2 closes the switch 16 which short circuits the section 15a of the resistor 15, and closes the switch 24 which short circuits the section 21a of the resistor 21, although this has no effect since this section 21 is already short circuited by the S3 switch 26.

In the fourth position of controller 27, the switch 52 on controller 27 closes, closing a circuit from main 13 through conductor 53, the coil R3 and switch 44 to the main 14. The coil R3 closes its switch 17, thus short circuiting the section 15b of the resistance. Also the coil R3 closes its switch 23, thus shorting the section 21b of the resistor 21, but this has no effect so long as the S3 switch 26 remains closed.

Also in the fourth position of the controller 27, its switch 57 closes, thereby closing a circuit connecting the upper S2 coil across the resistor 15, this circuit leading from the left-hand end of the resistor through the conductor 58, switch 57, S2 switch 59, upper S2 coil, switches 37 and 38 to the main 14. Assuming normal motor current, the coil S2 is energized by the voltage across the resistor 15 to close its switch 25 short circuiting the resistance section 21d of the resistance 21, opens the switch 59 and closes the switch 60 thereby establishing a holding circuit from main 13 through switch 31a, LB1 switch 39, conductor 61, resistor 62, switch 60, coil S2 and switches 37 and 38 to main 14.

As will be described hereinafter, this upper relay coil S2 is not energized sufficiently by the voltage drop upon acceleration after coasting at a regenerative speed to pick up and short the resistance 21d. Consequently, the shunt field current is limited to a low value and regenerative braking is prevented in the event that the controller 27 is turned on after coasting.

In its fifth step, the controller 27 closes the switch 54, thus energizing the coil R4 which closes its switch 18 to short circuit the section 15c of the resistor 15, and opens its switch 22. In this step, the switch 50 is opened thereby deenergizing the coil R2, whereupon the switch 16 and 24 open without affecting the circuit at this time.

The circuit of the coil R5 is closed on the sixth step of the controller 27 by its switch 55. This coil R5 closes its switch 19 which short circuits the section 15d of the resistor 15.

Also in the sixth position, the switch 41 opens, thus deenergizing the coil R1 and its switch 32 drops open. In this position also, the switch 52 is opened and the coil R3 is deenergized, its switches 17 and 23 dropping open. The opening of these switches has no effect at this time on the control, however.

In the seventh position, the controller 27 closes its switch 56, thereby closing the circuit of the R6 coil which closes its switch 20 and connects the resistance sections 15a, 15b, 15c and 15d in parallel with the section 15e. Also the switch 54 opens to deenergize the R4 coil, thereby opening the switch 18 and closing the switch 22, but without affecting the control at the present time.

In the 8th position, the R3 coil is energized by the reclosing of the switch 52 of controller 27. The R3 coil closes its switch 17 thereby shorting the resistance sections 15a and 15b leaving sections 15c and 15d in parallel with the section 15e. Also the switch 23 is closed but without affecting the circuits since the switch 26 is closed, short circuiting the resistor sections 21a to 21c.

In the 9th position of the controller 27, the coils R2 and R4 are energized by the closing of the controller switches 50 and 54. The closure of the switches 16 and 18 by the R2 and R4 coils connects the resistor sections 15a, 15b, 15c and 15e in parallel with each other in the armature circuit of the motor for increased current flow and acceleration.

In the 10th step, the controller switch 41 is again closed whereby the R1 coil is energized and its switch 32 again closed. In view of the fact that the R6 switch 20 is now closed, the switch 32 closes a short circuit for the resistance 15 through the switch 20.

In position 11, the controller switch 45 opens thereby deenergizing the S3 coil which opens its switch 26 thereby inserting the resistance section 21c in the shunt field circuit for decreased field, the sections 21a and 21b being shorted by the switches 24 and 23 which are closed. It should be noted that the S2 coil is now energized and, therefore, the resistance section 21d is short circuited by the switch 25.

In the 12th position, the controller switch 55 opens thereby deenergizing the R5 coil whose switch 19 opens, although this does not affect the circuit. Also in this position, the controller switch 52 is opened whereby the R3 coil is deenergized and the R3 switch 23 opens to insert a resistance section 21b in the shunt field circuit.

In the 13th position, the controller switch 50 is opened whereby the R2 coil is deenergized and the switch 24 opened to insert the resistance section 21a in the shunt field circuit for further decreased shunt field excitation.

In the 14th and last position of the controller 27, its switch 43 is opened whereby the lower S1 coil is deenergized thereby opening its switches 46 and 47 and deenergizing the shunt field. The motor now operates at full speed on its series field 11.

*Automatic control of the controller 27*

As previously stated, in the operation of the controller 27, the pedal 28 may be depressed completely at once. This twists and thereby stresses a spring which applies a force to advance the controller step-by-step at a rate not greater than a predetermined rate and subject to response to the motor armature current in the current coil 63. This mechanism is controlled by the R1 switch 64 and the S1 switch 65, one or the other of which must be closed for operation of this mechanism. The two section coil 66, having its sections electrically connected so as to neutralize each other, is energized from the conductor 40 through the coil, conductor 67 and switches 37 and 38 to the main 14. When the current in the motor armature circuit has decreased to a predetermined low value, the current coil 63 releases its armature and allows the switch 68 to close and short circuit the left-hand section of the coil 66. The coil 66 now picks up its armature 69 thus releasing the ratchet wheel 70. The contacts 71, previously held closed by the tension applied by the spring 72, thereupon separate removing the short circuit from the left-hand half of the coil 66 whereupon the armature 69 is released. In the meantime, the ratchet wheel 70 has advanced one tooth and the controller 27 has moved to the next position. Also the armature 69 when picked up, closed a circuit through the contacts 73 which energized the voltage coil 74. The circuit of the coil 74 is from the conductor 40 through the switch 65, conductor 75, the coil 74, contacts 73 to conductor 67. The coil 74 opens the switch 68 which is held open by the current coil 63 until the current falls to the predetermined low value whereupon the cycle is repeated for advance of the controller another notch. If the current is not high enough to hold the switch 68 open, the controller advances at a predetermined rate, such as one notch each one-fifth of a second.

This advance of the controller 27 is carried out automatically, the armature current coil 63 serving to maintain the switch 68 open and prevent advance in the event of an armature current greater than a predetermined maximum, so long as one of the switches 64 and 65 is closed, but it will be observed that one or the other of these switches is closed for the 14 steps of the controller. The current setting of the relay switch 68 is increased when the pedal is depressed by tensioning the biasing spring 68a of the relay. This is effected through the levers 28b—28c connecting the spring with the pedal 28.

*Dynamic braking*

As indicated in the sequence chart, dynamic braking is effected by energization of the coils R3, B1, S1, S2 and S3. In the first position of the braking controller 29, the controller 27 having been returned to its off-position, the normally opened switches 76 and 77 are closed. These switches control respectively the B1 coil and a coil 78, but the coil 78 is timed to pick up its armature and close its switch 79 before the coil B1 picks up its armature.

The circuit for the coil 78 is from the main 13 through the switch 77, the B1 switch 80 which is then closed, the coil 78, conductor 81 and the braking controller switch 82 which is closed to the main 14. The coil 78 closes its switch 79 and thereby connects the S1 coil directly across the supply mains through the switches 77, 79 and 83. This causes the S1 relay to pick up to close its switches 46 and 47 and connect the shunt field winding 12 to the supply mains 13 and 14 with the resistances 21b, 21c and 21d included in series with the shunt field winding. At this time, the R4 switch 22 is closed and short circuits the resistance section 21a. Immediately after the energization of the coil 78 and S1 coil, the B1 coil picks up its armature closing its switch 84 and thereby connecting the armature of the motor directly across the resistances 15c, 15d and 15e for dynamic braking. Also the B1 switch 84a closes thereby connecting the upper S1 coil directly across this resistance so that it is energized by the voltage drop across these resistances to hold the S1 switches 46, 47 and 65 closed when the B1 switch 80 opens. It will be noted that the switch 80 opens the circuit of the coil 78 which, in turn, opens its switch 79 and deenergizes the lower S1 coil The circuit for the B1 coil is from the main 13 through the switch 76, LB1 interlock switch 85 which is closed, the B1 coil, the R4 interlock switch 86 which is closed, conductor 75

87 and the normally opened braking controller switch 88, which is closed, to the conductor 14. Also the lower S2 coil, connected in parallel with the B1 coil, is energized and closes its switch 25 to short circuit the resistance 21d.

The braking controller 29 gives three steps of dynamic or rheostatic braking in the positions marked 1, 1A and 2 in Fig. 3 of increasing braking effect. For example, these steps may give retardations for the vehicle of respectively ½, 1 and 1½ miles per hour per second.

Also preferably the braking controller is connected to operate an air brake valve 88a (Fig. 2) in air brake supply pipe 88b for air brakes (not shown) on the vehicle. This valve 88a is connected to be driven by the braking controller so that for position 1 of the braking controller a small amount of air is applied to the brakes; in position 1A, giving greater dynamic braking, but little if any increase in air brake air pressure and in position No. 2, giving the maximum dynamic braking, possibly a slight increase in air brake air pressure for increased air braking. Movement of the controller 29 from position 2 to position 3 provides a continuously increasing air brake air pressure while holding the maximum dynamic braking. Movement of the controller 29 from position 3 to position 4 continues to increase the air brake air pressure but reduces the dynamic braking to a minimum value.

Thus all normal stops are made with the dynamic brake supplemented by the amount of air braking, the amount of air braking being obtained by the position of the brake pedal 30. In an emergency application of the brakes where the pedal 30 is depressed to bring the controller 29 to its fourth position, the dynamic brake is thus reduced to the minimum value so as to prevent excessive braking effort on the driving wheels of the vehicle.

It will be observed that when the brake pedal 30 is depressed to rotate the braking controller 29 to the first position, the switches 51 and 38 are opened to deenergize the circuits used for acceleration of the motor.

In position 1A of the braking controller 29, the switch 89 is closed whereby the R3 coil is energized through the switch 82 on the braking controller. The R3 coil closes its switch 23 thus short circuiting the resistance 21b in the shunt field circuit for increased field excitation and increased dynamic braking.

In position 2 of the controller 29, the S3 coil is energized through the switch 90, which is closed, and the switch 82. The S3 coil closes its switch 26 which short circuits the resistance 21c in the shunt field circuit to give the maximum shunt field excitation and maximum dynamic braking.

As previously observed in position 3 of the controller 29 the dynamic braking is the same as in position 2. In going from position 3 to position 4, however, the switch 90 and 89 are opened whereby the S3 and R3 coils are deenergized and the resistances 21c and 21b reinserted for the minimum dynamic braking.

The upper S1 coil is energized sufficiently by the voltage drop across the resistor 15 to hold its switches closed until the speed of the vehicle drops to a low value, for example, three or four miles per hour. At that time, the S1 switches drop out disconnecting the shunt field from the supply source and thereby discontinuing the dynamic braking.

*Operation after coasting*

It will be assumed that the vehicle was accelerated to a speed such as 20 miles per hour at which regenerative braking would take place if the controller 27 were turned back and allowed to remain in a lower speed position. Then it will be assumed that the operator releases the pedal 28 whereupon the controller 27 returns to the off position and the motor is disconnected from the supply source, the vehicle being allowed to coast for a certain period. While the vehicle is still running at a speed above the speed necessary for regenerative braking, assume that the pedal 28 is again depressed to some high speed position, for example, to its maximum high speed position. The controller 27 is moved step-by-step at a predetermined rate under the control of the automatic ratchet mechanism to the high speed position selected. Several seconds may be required, however, for the controller to reach this position. During the initial positions, the resistance 21d of high value is connected in the shunt field circuit so that the shunt field energization is at a low value and regenerative braking thereby prevented.

In any case, the resistance 21d remains in the field circuit to the 4th position of the controller 27. In the 4th position, as previously explained, the controller switch 57 closes and connects the upper S2 coil directly across the resistance 15. The S2 coil will not be energized sufficiently, however, by the voltage drop in the resistance to cause it to pick up its contacts because of the low motor current assuming, of course, that the vehicle is running at a speed higher than the normal speed for this 4th position. Therefore, in the 4th position, the high resistance 21d in the shunt field circuit is not short circuited, but remains in the circuit and maintains a reduced current in the shunt field. The result is reduced voltage across the motor armature and, consequently, no regenerative braking takes place.

As the controller 27 is moved forward, it will reach some position corresponding to the speed at which the vehicle is running, in which case, the motor will be carrying full armature current with the result that the voltage drop across the accelerating resistance 15 is great enough to cause the upper S2 coil to pick up and short circuit the resistance 21d in the shunt field circuit. Motoring operation then begins. In any case, when the 12th position of the controller 27 is reached, the upper S2 coil is energized and the switch 25 closed to short circuit the resistance 21d by the closing of the R5 switch 91, the R6 switch 92 being closed, whereby a short circuit around the S2 switch 60 is closed. For speeds above 20 miles per hour the S2 coil probably is not energized sufficiently to pick up before the 12th position.

It will be understood that regenerative braking can be obtained after the 10th position of the controller 27 has been passed by returning the controller 27 part way back toward the off position so as to strengthen the shunt field, but not to the off position. As previously explained, when the controller is returned to the off position, regenerative braking does not take place when it is moved again immediately to a running position. When the pedal 28 is released, the controller 27 is turned back so rapidly to the off position that no regenerative braking occurs, the time being insufficient for the shunt field to build up. It will be observed that from the 14th position of controller 27 back to the 10th position, the shunt field is increased by energization of the coils S1, R2, R3 and S3 in the order mentioned.

*Automatic speed regulation*

Another feature is a signal relay to indicate when the vehicle exceeds a given predetermined speed. This relay comprises a holding coil 93 connected in series with the armature circuit of the motor and a pick-up coil 94 connected in the shunt field circuit of the motor. The coils operate a switch 95 in the circuit of a light 96. In circuit also with the light is an S1 switch 97 which is closed during motoring operation. When the switch 95 drops closed upon a predetermined minimum excitation of the coil 93 corresponding to a predetermined maximum speed of the motor and vehicle, such as over 35 miles per hour, the light 96 is connected across the resistance 62 and is illuminated. This warns the operator that he has reached the maximum permissible speed for the particular vehicle.

In this particular system, it may be possible to exceed this 35 miles per hour speed only on the 14th point of the controller 27, i. e., with no shunt field excitation. Therefore, the coil 94 which is the lifting coil for the relay is connected in the shunt field circuit so as to hold the switch 95 open when the shunt field is excited regardless of the armature current in the coil 93. On the 14th point of the controller, with the coil 94 deenergized, the switch 95 will close when the current in the coil 93 drops to a predetermined minimum value corresponding with the predetermined maximum speed.

The S1 interlock switch 97 is provided to disconnect the light when the pedal 28 is dropped back from the 14th position to cause regenerative operation which otherwise would result in closure of the relay switch 95 because of the reversed current through the coil 93. Moreover, the light 96 is connected across a resistance 62 in the holding circuit for the S2 coil to prevent possible illumination of the light before the S2 coil has picked up its armature and closed this holding circuit. This holding circuit through the conductor 61 and the resistance 62 is closed in the 4th position of the controller 27.

The overload relay switch 34 is operated by current coil 98 in circuit with the motor 10 and a voltage coil 99 which is energized when the current coil 98 picks up the relay. A second switch 100 which is normally open, is also operated by the coils 98 and 99. The movable contacts of these switches, shown as bridging contacts, are secured to the operated member of the coils 98 and 99 for limited sliding movement with respect thereto as indicated in the drawings. Thus, in the event of an overload causing the coil 98 to pick up its armature, a predetermined movement of the armature first closes the switch 100, the switch 34 remaining closed, and a continued movement of the armature then opens the switch 34. The switch 100 closes a circuit for the coil 99 in parallel with the LB1 coil, this circuit leading through the LB1 interlock switch 42a. When the switch 34 opens thus deenergizing the LB1 coil which disconnects the motor from the supply mains, the relay is held open by the coil 99, the coil 98 then, of course, being deenergized because the motor is disconnected from the supply mains. It then becomes necessary for reenergization of the motor to return the controller 27 back to the starting position so as to open the switches 32a and 37 and thereby deenergize the coil 99 which allows the switch 34 to reclose and reopens the switch 100.

The combined electric and air braking system disclosed in this application is covered by our divisional application, Serial No. 306,396, filed November 27, 1939.

While we have shown a particular embodiment of our invention, it will be understood, of course, that we do not wish to be limited thereto, since many modifications may be made and we, therefore, contemplate by the appended claims to cover any such modifications as fall within the true spirit and scope of our invention.

What we claim as new and desire to secure by Letters Patent of the United States is:

1. The combination with a traction motor provided with a field winding, of means for controlling the energization of said motor, a resistance connected in circuit with said field winding of such value as to prevent regenerative operation of said motor when said motor is reenergized while coasting deenergized, and means responsive to the current in said motor for controlling said resistance.

2. The combination with a traction motor provided with a shunt field winding, of an acceleration resistance therefor, a field resistance connected in circuit with said field winding of such value as to prevent regenerative operation of said motor when said motor is reenergized while coasting deenergized at a speed greater than a low running speed, and means responsive to the voltage drop across said acceleration resistance for controlling said field resistance.

3. The combination with a traction motor provided with a shunt field winding, of acceleration resistance for said motor, an acceleration controller for said resistance, a field resistance connected in circuit with said field winding of such value as to prevent regenerative operation of said motor when said acceleration controller is operated to reenergize said motor while said motor is coasting deenergized at a regenerative speed, and means responsive to the voltage drop across said acceleration resistance for shunting said field resistance.

4. The combination with a traction motor provided with a shunt field winding, of an acceleration resistance for said motor, an acceleration controller for said resistance, means for advancing said acceleration controller at a predetermined rate, a resistance connected in circuit with said field winding of such value as to prevent regenerative braking by said motor when said motor is energized after coasting operation, and means responsive to the current in said motor for controlling said field resistance.

5. The combination with a traction motor provided with a shunt field winding, of an acceleration resistance for said motor, an acceleration controller for said resistance, means for advancing said acceleration controller at a predetermined rate, a resistance connected in circuit with said field winding of such value as to prevent regenerative braking by said motor when said motor is energized after coasting operation, and means responsive to the voltage drop across said acceleration resistance for shunting said field resistance.

6. The combination with a traction motor provided with an armature and a field winding, an acceleration controller for said motor, an acceleration resistance controlled by said acceleration controller, operating means for said acceleration controller, control means responsive to the armature current in said motor for advancing said acceleration controller when said operating means is actuated, a resistance in circuit with said field winding of such value as to prevent regenerative operation of said motor when said motor is energized after coasting, and means responsive to the operation of said motor for controlling said field resistance.

7. The combination with a traction motor provided with an armature and a field winding, an acceleration controller for said motor, an acceleration resistance controlled by said acceleration controller, operating means for said acceleration controller, control means responsive to the armature current in said motor for advancing said acceleration controller when said operating means is actuated, a resistance in circuit with said field winding of such value as to prevent regenerative operation of said motor when said motor is energized after coasting, and means responsive to the armature current in said motor for controlling said shunt field resistance.

8. The combination with a traction motor provided with an armature and a shunt field winding, an acceleration controller for said motor, an acceleration resistance controlled by said acceleration controller, operating means for said acceleration controller, a spring connecting said operating means to said controller, control means for advancing said acceleration controller at a predetermined rate when said operating means is actuated, means responsive to the armature current in said motor for disabling said control means, a resistance in circuit with said shunt field winding of such value as to prevent regenerative operation of said motor when said motor is energized after coasting, and means responsive to the voltage drop across at least a portion of said acceleration resistance for shunting said shunt field resistance.

9. The combination with a traction motor provided with an armature and a shunt field winding, an acceleration controller and a braking controller for said motor, an armature resistance controlled by said acceleration controller, pedal operating means for said acceleration controller, a spring connecting said operating means and said acceleration controller, control means providing for advance of said acceleration controller at a predetermined rate when said pedal is depressed, means responsive to the armature current in said motor for disabling said control means, a resistance in circuit with said shunt field winding of such value as to prevent regenerative operation of said motor when said motor is energized after coasting while operating at a speed greater than a low running speed, and means responsive to the operation of said motor for controlling said shunt field resistance.

10. The combination with a traction motor provided with an armature and a shunt field winding, an acceleration controller and a braking controller for said motor, an armature resistance controlled by said acceleration controller, pedal operating means for said acceleration controller, a spring connecting said operating means and said acceleration controller, control means providing for advance of said acceleration controller at a predetermined rate when said pedal is depressed, means responsive to the armature current in said motor for disabling said control means, a resistance in circuit with said shunt field winding of such value as to prevent regenerative operation of said motor when said motor is energized after coasting while operating at a speed greater than a low running speed, means responsive to the voltage drop across at least a portion of said armature resistance for shunting said field resistance when said acceleration controller is advanced to a position corresponding to the speed of said motor, means operated by said braking controller for connecting said armature resistance to said motor for dynamic braking, and means responsive to a voltage drop across said armature resistance for deenergizing said shunt field winding.

11. The combination with a traction motor provided with an armature and a shunt field winding, an acceleration resistance, a shunt field resistance, an acceleration controller, means operated by movement of said controller for energizing said motor with its armature in circuit with said acceleration resistance, means operated by further movement of said controller for energizing said shunt field winding with said field resistance in circuit therewith, a switch for short circuiting said field resistance, a coil for operating said switch to short circuit said field resistance, means operated by further movement of said controller for connecting said coil across said acceleration resistance for energization of said coil by the voltage drop across said resistance and closure of said switch immediately during acceleration from rest or a speed below a regenerative braking speed to give increased shunt field excitation.

12. The combination with a traction motor provided with an armature and a shunt field winding, an acceleration resistance, a shunt field resistance, an acceleration controller, means operated by movement of said controller fo.' energizing said motor with its armature in circuit with said acceleration resistance, means operated by further movement of said controller for energizing said shunt field winding with said field resistance in circuit therewith, a switch for short circuiting said field resistance, a coil for operating said switch to short circuit said field resistance, means operated by further movement of said controller for connecting said coil across said acceleration resistance for energization of said coil by the voltage drop across said resistance and closure of said switch immediately during acceleration from rest or a speed below a regenerative braking speed to give increased shunt field excitation, means responsive to closure of said switch for establishing a holding circuit for said coil, and switching means controlled by further movement of said controller for short circuiting said acceleration resistance.

13. The combination with a traction motor provided with an armature, a series field winding and a shunt field winding, an acceleration resistance, a shunt field resistance including a low resistance section and a high resistance section, an acceleration controller, means operated by movement of said controller for energizing said motor with its armature in circuit with said acceleration resistance and said series field winding, means operated by further movement of said controller for energizing said shunt field winding with said high resistance section in series therewith, means operated by further movement of said controller for short circuiting a portion of said acceleration resistance for acceleration of said motor, a switch for short circuiting said high resistance section, a coil for operating said switch to short circuit said high resistance section, means operated by further movement of said controller for connecting said coil across said acceleration resistance for energization of said coil by the voltage drop across said resistance and closure of said switch immediately during acceleration from rest or a speed below a regenerative braking speed to give full shunt field excitation, means responsive to closure of said switch for establishing a holding circuit for said coil, and switching means controlled by further movement of said controller for short circuiting additional sections of said acceleration resistance, then inserting said low resistance section of said shunt field resistance in circuit with said shunt field winding for reduced shunt field and then deenergizing said shunt field for acceleration of said motor to full speed with series field excitation.

CHARLES MacDONALD.
JACOB W. McNAIRY.